United States Patent [19]

Hartman

[11] Patent Number: 5,580,590
[45] Date of Patent: Dec. 3, 1996

[54] ENVIRONMENTALLY FRIENDLY CHEWING GUM COMPOSITIONS CONTAINING ELASTIC PROTEIN-BASED POLYMERS AND METHOD OF MAKING IT

[75] Inventor: Scott E. Hartman, Roosevelt, N.J.

[73] Assignee: The Wm. Wrigley Jr. Company, Chicago, Ill.

[21] Appl. No.: 174,185

[22] Filed: Dec. 27, 1993

[51] Int. Cl.$^6$ ........................................................ A23G 3/30
[52] U.S. Cl. .............................. 426/3; 426/4; 426/5; 426/6
[58] Field of Search ............................................... 426/3–6

[56] References Cited

U.S. PATENT DOCUMENTS

| | | | |
|---|---|---|---|
| 1,700,387 | 1/1929 | Stetson | 426/3 |
| 2,154,482 | 4/1939 | Weber | 426/3 |
| 2,469,861 | 5/1949 | Cohoe | 426/3 |
| 2,586,675 | 2/1952 | Lutz | 426/3 |
| 4,863,900 | 9/1989 | Pollack et al. | 514/12 |
| 5,124,156 | 6/1992 | Shibata et al. | 424/440 |
| 5,173,317 | 12/1992 | Hartman et al. | 426/6 |
| 5,294,449 | 3/1994 | Greenberg | 426/3 |

OTHER PUBLICATIONS

"Owen R. Fennema Food Chemistry" 1985. p. 862.

*Primary Examiner*—Esther Kepplinger
*Assistant Examiner*—Lien Tran
*Attorney, Agent, or Firm*—Hill, Steadman & Simpson

[57] ABSTRACT

A chewing gum composition is provided comprising a water soluble gum portion and a water insoluble gum base portion including an elastic protein-based polymer. Additionally, a method for creating an environmentally acceptable chewing gum is provided comprising the steps of creating a chewing gum base that includes a sufficient amount of elastic protein-based polymer to create a resultant chewing gum that is more environmentally acceptable than a chewing gum without elastic protein-based polymer, and adding to the chewing gum base a water soluble portion to create the resultant chewing gum.

21 Claims, No Drawings

ENVIRONMENTALLY FRIENDLY CHEWING GUM COMPOSITIONS CONTAINING ELASTIC PROTEIN-BASED POLYMERS AND METHOD OF MAKING IT

BACKGROUND OF THE INVENTION

The present invention relates generally to chewing gum compositions and methods of making same. More specifically, the present invention relates to chewing gum compositions that are more environmentally acceptable than typical compositions.

For hundreds of years, people have enjoyed chewing gum-like substances. In the late 1800's the predecessor to today's chewing gum compositions were developed. Today, chewing gum is enjoyed daily by millions of people worldwide.

Chewed gum is easily disposed of in the wrapper that initially houses the chewing gum. Likewise, chewed gum can be disposed of in other substrates by wrapping the substrate around the chewed gum.

Although chewed gum can be easily disposed of without creating any problems, chewing gum improperly disposed of can create environmental concerns. In this regard, the improper disposal of the chewing gum, i.e., expectorating the chewing gum on a sidewalk, floor, or like area can create a nuisance. Typical chewing gum, due to its formulation, after it is chewed has adhesive-like characteristics. Therefore, chewed gum can stick to surfaces to which it is placed.

Unfortunately, many consumers do not properly dispose of chewed gum. Thus, in areas such as parks, amusement parks, shopping centers, and other public areas, chewed gum is expectorated on sidewalks and like surfaces or stuck on walls, statuary or other structures. This thereby necessitates the manual removal of the stuck chewed gum using a scraping device or other means. Depending on the length of time after placement of the chewed gum and subsequent removal, it may not be possible to easily remove all of the chewed gum from the structure to which it was stuck.

A further problem is that if chewed gum is deposited on the ground, sidewalk, or other surface and is stepped on, the chewed gum can become attached to a person's shoe. The chewed gum can then be transferred from the person's shoe to another surface such as a car or carpet. Chewed gum, due to its adhesive nature, may be difficult to remove from carpet-like surfaces or clothing.

There is therefore a need for a chewing gum that will degrade and/or can be easily removed from indoor/outdoor surfaces and/or that can be ingested after chewing or will dissolve in the mouth after a period of chewing.

SUMMARY OF THE INVENTION

The present invention provides a chewing gum composition that is environmentally friendly. As used herein, the term "environmentally friendly" refers to a chewing gum composition that: will degrade; can be easily removed from indoor or outdoor surfaces; can be ingested after chewing; and/or will dissolve in the mouth after a period of chewing.

To this end, the present invention provides chewing gum compositions that include elastic protein-based polymers. These polymers provide a chewing gum that is environmentally friendly. In this regard, the chewing gum composition of the present invention will become brittle after it is expelled by the consumer and can therefore be easily removed from surfaces to which the chewed gum is placed or attached. If desired, the chewing gum including elastic protein-based polymers can be swallowed and ingested by the consumer.

Accordingly, a chewing gum composition is provided that comprises a water soluble gum portion and a water insoluble gum base portion including an elastic protein-based polymer that may dissolve or may be water insoluble.

In an embodiment, the gum base comprises from approximately 1 percent to about 99 percent by weight elastic protein-based polymer.

In an embodiment, the elastic protein-based polymer has coupled thereto a medicament.

In an embodiment, the elastic protein-based polymer has coupled thereto a nutritional compound.

In an embodiment, the base also includes an elastomer.

In an embodiment, the base also includes an elastomer plasticizer.

The present invention also provides a method for creating an environmentally acceptable chewing gum comprising the steps of: creating a chewing gum base that includes a sufficient amount of elastic protein-based polymer to create a resultant chewing gum that is more environmentally acceptable than a chewing gum without elastic protein-based polymer; and adding to the chewing gum base a water soluble portion to create a resultant chewing gum.

In another embodiment, the present invention provides a chewing gum composition comprising a flavor, a sweetener, a texturizer, and an elastic protein-based polymer.

An advantage of the present invention is to provide a chewing gum composition that is environmentally friendly.

Another advantage of the present invention is to provide a chewing gum base that contains an elastic protein-based polymer.

Still further, an advantage of the present invention is to provide a chewing gum composition that after being chewed, can be easily removed from physical surfaces by mechanical means.

Furthermore, an advantage of the present invention is to provide a chewing gum composition containing an elastic protein-based polymer that can have attached to the polymer drugs or nutritional compounds that can be delivered to the consumer by chewing the gum and/or swallowing the gum cud.

Moreover, an advantage of the present invention is to provide a method for producing chewing gum containing elastic protein-based polymers.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved chewing gum compositions and methods for making same. Pursuant to the present invention, chewing gum compositions are provided that include an elastic protein-based polymer. Due to the use of the elastic protein-based polymer, a chewing gum composition is provided that can, after being chewed, be easily removed from physical surfaces to which it is expelled or attached. Still further, the elastic protein-based polymers can be ingested. This allows compositions, such as polymer drugs, or nutritional compounds, to be delivered to the consumer. To this end, polymer drugs or nutritional compounds can be attached to the elastic protein-based polymer and the chewing gum cud can be swallowed/ingested by the consumer.

Elastic protein-based polymers may be added to a gum base or, more preferably, used in gum in place of a typical gum base. As used herein, the term "elastic protein-based polymers" includes elastic polypeptides or bioelastic polymers as they are sometimes referred to.

Elastic protein-based polymers are cross-linked high molecular weight polymers comprised of repeating polypeptide (poly-amino acid) monomers. The preferred polypeptide is a pentapeptide of valine (val), glycine (gly) and proline (pro) as in the SEQ ID NO: 1. The elastic protein-based polymers may be comprised solely of a polymer having monomers of SEQ ID NO. 1, the main pentapeptide in the biological protein elastin, or may be comprised of a combination of SEQ ID NO: 1 and its analogues, these analogues being another polypeptide monomer similar to SEQ ID NO: 1 but having one or more amino acid residues substituted with other peptides or having one or more chemical compounds incorporated between the peptide monomers or attached to the peptide monomer.

Varying the elastic protein-based polymers repeating polypeptide composition by way of inserting between the poly(VPGVG) monomers analogues of (VPGVG) will alter the characteristics of the elastic protein-based polymers after this polymer is cross-linked by means known to those in the art, e.g., by gamma irradiation or enzymatically. Cross-linking causes the elastic protein-based polymers to become elastic.

By altering these characteristics, one may change the rate of water solubility or the degree of elasticity at various temperatures, thus providing variety to the chewing texture of the gum containing this elastic protein-based polymers. The degree of cross-linking may also alter the elastic protein-based polymers characteristics such as water solubility. Also, by having the ability to attach drugs, nutritional compounds, or other chemical compounds to this polymer, other benefits are realized. For example, drug delivery by way of a chewing gum matrix is possible, e.g., the compound attached to the repeating polypeptide monomer may be a medicament such as a non-steroidal anti-inflammatory drug, an anesthetic or a nutrition compound such as a vitamin.

There are a number of other ways to modify the elastic protein-based polymers that are created. For example, the monomers can be synthesized either microbially via genetic engineering or chemically via typical methods. These monomers can then be polymerized to produce the elastic protein-based polymers. The elasticity, dissolvability, hydrophobicity, and the like of the elastic protein-based polymers can be modified by adding within the polymeric chains of the elastic protein-based polymer's analogues of the polymer having SEQ ID NO. 1 monomers, and cross-linking the elastic protein-based polymers to the desired degree of elasticity via-irradiation of enzymatic or chemical methods.

An advantage of elastic protein-based polymers is that they are non-toxic and biocompatible. They have an inertness to a wide variety of compounds and food ingredients. Thus, the elastic protein-based polymers have a wide variety of application.

As noted, the elastic protein-based polymers may be added to typical gum base formulas or itself used as the gum base. Additionally, the ingredients of the chewing gum base formulations may be modified to provide desirable characteristics. Typical chewing gum ingredients include: elastomers; elastomer plasticizers; fillers; softeners; waxes; antioxidants; colorants; flavors; and bulk sweeteners; high intensity sweeteners; flavoring agents; softeners; emulsifiers; colors; acidulants; fillers; and other components that provide desired attributes.

Chewing gum generally consists of a water insoluble gum base, a water soluble portion, and flavors. The water soluble portion dissipates with a portion of the flavor over a period of time during chewing. The gum base portion is retained in the mouth throughout the chew. The insoluble gum base generally comprises elastomers, resins, fats and oils, softeners, and inorganic fillers.

Elastomers provide the rubbery, cohesive nature to the gum which varies depending on this ingredient's chemical structure and how it is blended with other ingredients. Elastomers suitable for use in gum base may include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tunu, chilte, chiquibul, gutta hang kang, synthetic rubber such as butadiene-styrene copolymers, polyisobutylene, isobutylene-isoprene copolymers, polybutadiene, vinyl polymers such as polyvinyl acetate, polyethylene, vinyl copolymers such as vinyl acetate/vinyl laurate, ethylene/vinyl acetate, polyvinyl alcohol or mixtures thereof.

Elastomer plasticizers vary the firmness of the gum base. Their polymer plasticizing strength and their varying softening points cause varying degrees of finished gum firmness when used in base. This is an important consideration when one wants to use flavors that differ in plasticizing strength of the gum base in finished gum.

Elastomer plasticizers suitable for use in gum base include natural rosin esters such as glycerol ester of partially hydrogenated rosin, glycerol ester of polymerized rosin, glycerol ester of partially dimerized rosin, glycerol ester of rosin, glycerol ester of tall cil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene and mixtures thereof.

Fillers modify the texture of the base and aid in processing. Fillers suitable for use in gum base include carbonate types such as magnesium and calcium carbonate, ground limestone and silicate types such as magnesium and aluminum silicate, clay, alumina, talc, as well as titanium oxide, mono-, di- and tricalcium phosphate, cellulose polymers such as ethyl, methyl and wood or mixtures thereof.

Softeners modify the texture and cause the hydrophobic and hydrophilic components of the base/chewing gum to be miscible. Softeners suitable for use in the inventive gum base include hydrogenated vegetable oil, nonhydrogenated vegetable oil, lard, hydrogenated tallow, cocoa butter, glycerol monostearate, glycerol triacetate, lecithin, mono-, di- and triglycerides, acetylated mono-, di- and triglycerides, distilled mono-, di- or triglycerides, fatty acids such as stearic palmitic, oleic, linoleic and linolenic or mixtures thereof.

Waxes aid in the curing of the finished gum made from the gum base as well as improve the release of flavor, shelf-life and texture. Waxes suitable for the present invention include synthetic waxes such as polyethylene and Fischer-Tropsch waxes, natural waxes such as candelilla, carnauba, beeswax, rice bran, petroleum waxes such as microcrystalline and paraffin and mixtures thereof.

Antioxidants prolong shelf-life and storage of gum base, finished gum or their respective components including fats and flavor oils. Antioxidants suitable for use in gum base include butylated hydroxyanisole (BHA), butylated hydroxytoluene (BHT), beta-carotenes, tocopherols, acidulants such as Vitamin C, propyl gallate, other synthetic and natural types or mixtures thereof.

Colorants impart desired color characteristics or remove undesired color by whitening of the base. Colorants suitable for use in gum base include FD&C type lakes, plant extracts, fruit and vegetable extracts, titanium dioxide or mixtures thereof.

Gum bases are typically prepared by adding an amount of the elastomer, elastomer solvent and filler to a heated sigma blade mixer with a front to rear speed ratio of typically 2:1. The initial amounts of ingredients is determined by the working capacity of the mixing kettle in order to attain a proper consistency. After the initial ingredients have massed homogeneously, the balance of the elastomer solvent, filler, softeners, etc. are added in a sequential manner until a completely homogeneous molten mass is attained. This can usually be achieved in one to three hours, depending on the formulation. The final mass temperature can be between 70° C. and 130° C. and preferably between 100° C. and 120° C. The completed molten mass is emptied from the mixing kettle into coated or lined pans, extruded or cast into any desirable shape and allowed to cool and solidify.

If the elastic protein-based polymer is to be added to a typical gum base ingredient, the above process may be followed for the present invention with the exception that the processing temperature should be below 100° C., to prevent coacervation of the elastic protein-based polymer. The gum base may be comprised almost entirely of elastic protein-based polymer, the other gum base ingredients present in only small quantities to offer different characteristics to the base. Or the elastic protein-based polymer may be modestly present in the gum base, the other base ingredients being present at higher levels to offer somewhat typical gum base characteristics but modified by the elastic protein-based polymer so to be more environmentally friendly.

By way of example, and not limitation, examples of the present invention will now be given.

A gum base containing the typical ingredients and elastic protein-based polymer may have the compositions described below:

|  | Ex. 1 | Ex. 2 | Ex. 3 | Ex. 4 | Ex. 5 | Ex. 6 | Ex. 7 |
|---|---|---|---|---|---|---|---|
| EPBP Elastomer | 10 | 25 | 40 | 50 | 65 | 80 | 90 |
| Synthetic Rubber | 15 | 15 | 10 | 5 | 10 | — | — |
| Vinyl Polymer | 15 | 10 | — | 15 | 10 | 10 | 5 |
| Elastomer Plasticizer | 20 | 20 | 10 | — | — | — | — |
| Filler | 25 | 25 | 20 | 15 | 10 | — | — |
| Softener | 15 | 5 | 5 | 2 | 5 | 5 | 5 |
| Wax | — | — | 15 | 13 | — | 3 | — |

Preferably, the elastic protein-based polymer is used directly in the gum making process. More preferably, the elastic protein-based polymer takes the place of the typical gum base used in the gum making process. Typical gum ingredients can then be blended and mixed with the elastic protein-based polymer with little difficulty.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, starch hydrolysates and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additional sugarless sweeteners can include, but are not limited to, other sugar alcohols such as mannitol, xylitol, hydrogenated starch hydrolysates, maltitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; oligofructose; fructooligosaccharide; palatinose oligosaccharide; natural carbohydrate gum hydrolysate; or indigestible dextrins. However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Of these above-mentioned gum ingredients, the most preferred are simply flavor such as oil or water soluble types, sweeteners such as polyols, alditols, corn syrup, artificial high-intensity types, and texture modifiers such as water, glycerin, lecithin and the like. The most preferred texture modifier for use with the present invention is glycerin.

By way of example, to make a chewing gum comprised of elastic protein-based polymer that entirely replaces a typical gum base, from approximately 1 to about 99 percent elastic protein-based polymer by weight of the gum is added to a sigma blade mixer. It should be noted that the preferable percent level of the elastic protein-based polymer will vary depending on the gum cud size desired. For example, for a small gum cud, the preferred level of elastic protein-based polymer is from approximately 15 to about 30 weight percent and for a large gum cud, from approximately 50 to about 95 weight percent.

In mixing the elastic protein-based polymer composition, the temperature of the mixer should be below 100° C. Preferably, the temperature of the mixer should be between from 20° to 70° C. and more preferably, between from 25° to 50° C.

During the mixing, texture modifiers may then be added to soften and moisten the elastic protein-based polymer if its appearance in the mixer appears firm or dry. The preferred texturizers are water and glycerin, and the most preferred is glycerine. The level of the modifiers may range from approximately 1 to about 50 percent, depending on the level of elastic protein-based polymer used. Preferably, the texturizer level may range from approximately 5 to about 40 weight percent and more preferably, from approximately 6 to about 25 weight percent.

Next, the sweeteners may be added and blended into the batch. Usually, the alditol and polyol sweeteners are used as a bulking agent in gum batches having low levels of elastic protein-based polymer, from 15 to 30 weight percent for example. The high intensity sweeteners may be used in combination. Corn sweeteners and the like may be used in either gum batch.

Typically, the alditol and polyol type bulking sweeteners are added at from about 20 to 80 weight percent and preferably, from 30 to 60 weight percent. The high intensity sweetener may be present from about 0.1 to 3.0 weight percent on preferably, from 0.5 to 1.5 weight percent.

Next, flavors are added at a range of from about 0.5 to about 2.0 weight percent. Usually, the water soluble flavors and the powdered flavors are used in the gum batch at higher levels than the oil soluble flavors. The water soluble or oil soluble flavors are preferred.

Additional optional ingredients, such as colorants, may be added to the batch.

The resultant chewing gum of the present invention will be more environmentally friendly than typical chewing gum compositions. In this regard, if after being chewed the gum is expelled onto a surface, it will, after a short period of time, become hard and will be easy to remove. Additionally, the chewing gum cud can be swallowed by the consumer.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

---

SEQUENCE LISTING ( 1 ) GENERAL INFORMATION:

( i i i ) NUMBER OF SEQUENCES: 1

( 2 ) INFORMATION FOR SEQ ID NO:1:

( i ) SEQUENCE CHARACTERISTICS:
        ( A ) LENGTH: 5 amino acid residues
        ( B ) TYPE: amino acid
        ( C ) STRANDEDNESS: Not Relevant
        ( D ) TOPOLOGY: Not Relevant ( i i ) MOLECULE TYPE: peptide ( i i i ) SEQUENCE DESCRIPTION:SEQ ID NO:1:

VAL  PRO  GLY  VAL  GLY
                    5

---

I claim:

1. A chewing gum composition comprising:

a water soluble gum portion; and a water insoluble gum base portion including an elastic protein-based polymer that consists essentially of polypeptide units that include a repeating polypeptide monomer that is a peptide monomer and has a peptide sequence of SEQ ID NO: 1 the water insoluble gum base comprising at least 1% by weight elastic protein-based polymer.

2. The chewing gum composition of claim 1 wherein the water insoluble gum base comprises up to about 99 percent by weight elastic protein-based polymer.

3. The chewing gum composition of claim 1 including a texturizer.

4. The chewing gum composition of claim 3 wherein the texturizer is chosen from the group consisting of water and glycerin.

5. The chewing gum composition of claim 1 wherein the elastic protein-based polymer includes a repeating polypeptide monomer.

6. The chewing gum composition of claim 5 wherein the repeating polypeptide monomer is a pentapeptide monomer.

7. The chewing gum composition of claim 1 wherein the base also includes an elastomer.

8. The chewing gum composition of claim 1 wherein the base also includes an elastomer plasticizer.

9. A chewing gum composition comprising:

a water soluble gum portion; and a water insoluble gum base portion including an elastic protein-based polymer; wherein the elastic protein-based polymer includes a repeating polypeptide monomer that is a pentapeptide monomer and has a peptide sequence of SEQ ID NO: 1.

10. A method for creating an environmentally friendly chewing gum comprising the steps of:

creating a chewing gum base that comprises at least 1% by weight elastic protein-based polymer that includes a repeating polypeptide monomer that is a peptide monomer and has a polypeptide sequence of SEQ ID NO: 3, to create a resultant chewing gum that is more environmentally friendly than a chewing gum without elastic protein-based polymer; and adding to the chewing gum base a water soluble portion to create the resultant chewing gum.

11. The method of claim 10 wherein the chewing gum base comprises not more than about 99 percent by weight elastic protein-based polymer.

12. The method of claim 10 including a texturizer.

13. The method of claim 10 wherein the elastic protein-based polymer includes a repeating pentapeptide monomer and a repeating polypeptide monomer.

14. A chewing gum composition comprising:

a gum base;

a flavor;

a sweetener;

a texturizer; and an elastic protein-based polymer that consists essentially of polypeptides that include a repeating polypeptide monomer that is a peptide monomer and has a polypeptide sequence of SEQ ID NO: 1 and comprises at least 1% by weight of the gum base.

15. The chewing gum composition of claim 14 wherein the gum base comprises not more than 99 percent by weight elastic protein-based polymer.

16. The chewing gum composition of claim 14 wherein the texturizer is chosen from the group consisting of water and glycerin.

17. The chewing gum composition of claim 14 wherein the elastic protein-based polymer includes a repeating pentapeptide monomer and a repeating polypeptide monomer.

18. The chewing gum composition of claim 14 wherein the base also includes an elastomer.

19. The chewing gum composition of claim 14 wherein the base also includes an elastomer plasticizer.

20. A method for creating an environmentally friendly chewing gum comprising the steps of:

creating an elastic protein-based polymer that is crosslinked to provide desired elastic properties and that includes a repeating polypeptide monomer that is a peptide monomer and has a polypeptide sequence of SEQ ID NO: 1;

creating a chewing gum base that comprises at least 1% by weight of the elastic protein-based polymer; and adding to the chewing gum base a water soluble portion to create a resultant chewing gum.

21. The method of claim 20 wherein the elastic protein-based polymer is cross-linked by gamma irradiation.

* * * * *

UNITED STATES PATENT AND TRADEMARK OFFICE
CERTIFICATE OF CORRECTION

PATENT NO. : 5,580,590
DATED : Dec. 3, 1996
INVENTOR(S) : Hartman

It is certified that error appears in the above-identified patent and that said Letters Patent is hereby corrected as shown below:

Column 9, line 26, in Claim 10 reads "SEQ ID NO: 3"

and should read

--SEQ ID NO: 1--.

Signed and Sealed this

Twenty-first Day of November, 2000

*Attest:*

Q. TODD DICKINSON

*Attesting Officer*    *Director of Patents and Trademarks*